M. RAHR, Jr.
VEHICLE CURTAIN.
APPLICATION FILED AUG. 26, 1920.

1,428,709.

Patented Sept. 12, 1922.
3 SHEETS—SHEET 1.

INVENTOR.
Maximilian Rahr Jr.
BY
Erwin Wheeler & Woodard
ATTORNEYS.

M. RAHR, Jr.
VEHICLE CURTAIN.
APPLICATION FILED AUG. 26, 1920.
1,428,709.
Patented Sept. 12, 1922.
3 SHEETS—SHEET 2.
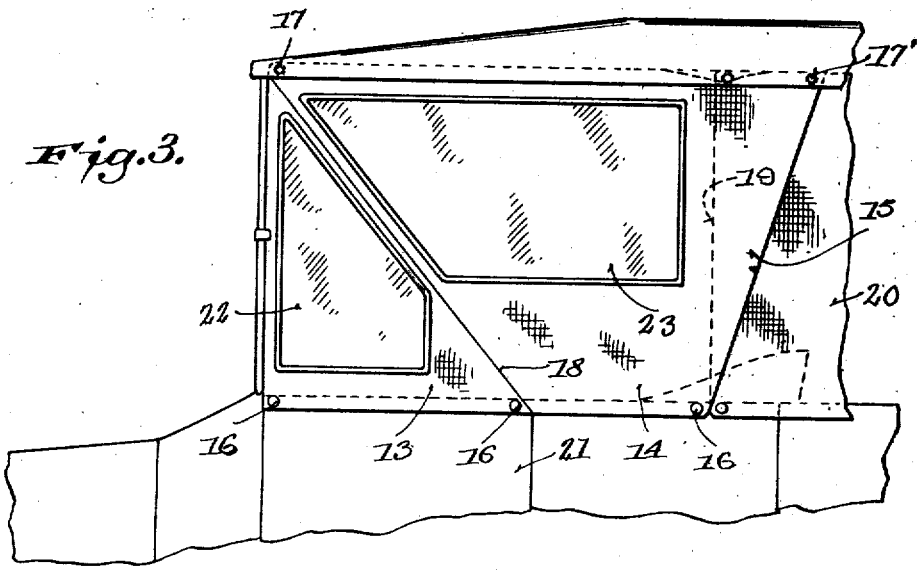
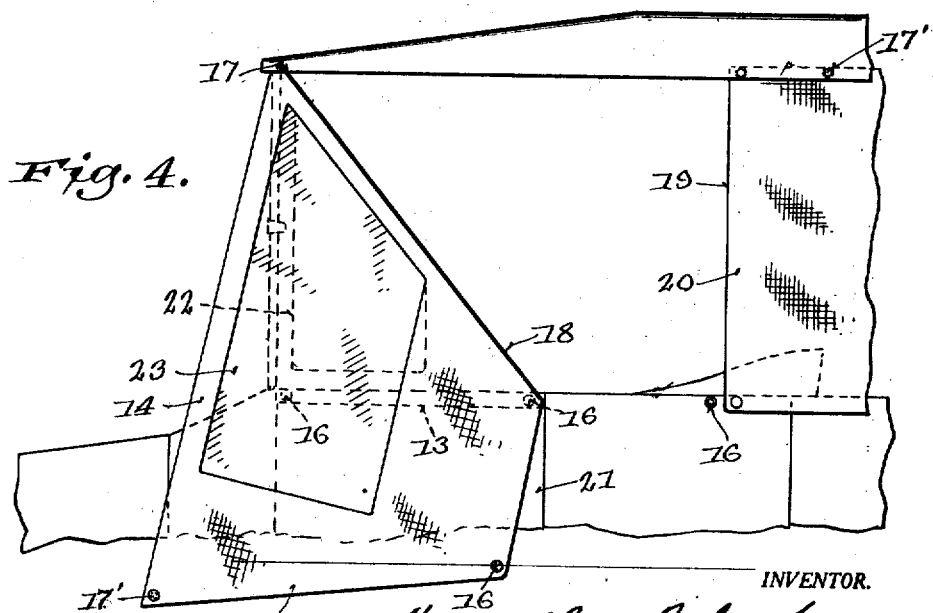
INVENTOR.
Maximilian Rahr Jr.
BY
Erwin Wheeler & Woolard
ATTORNEYS.

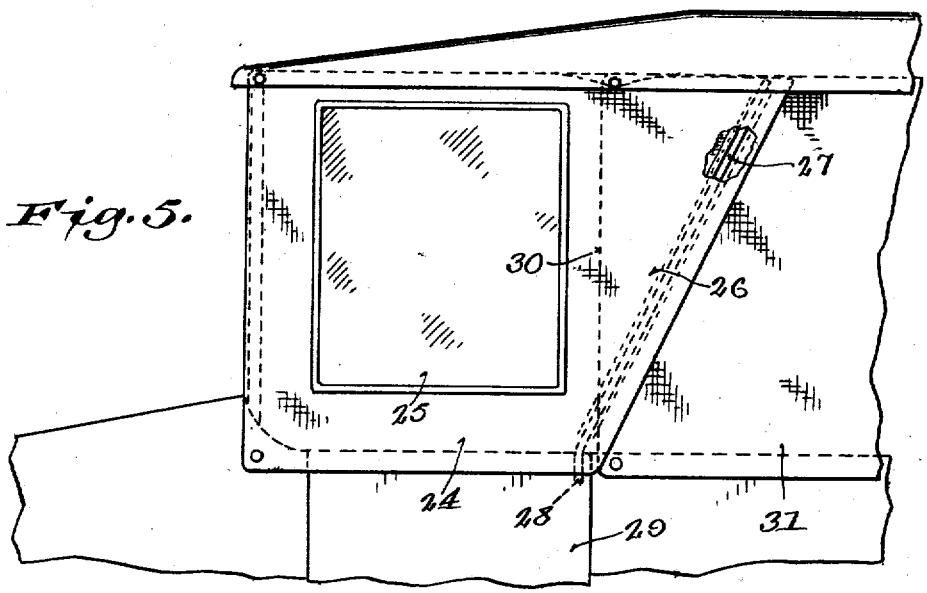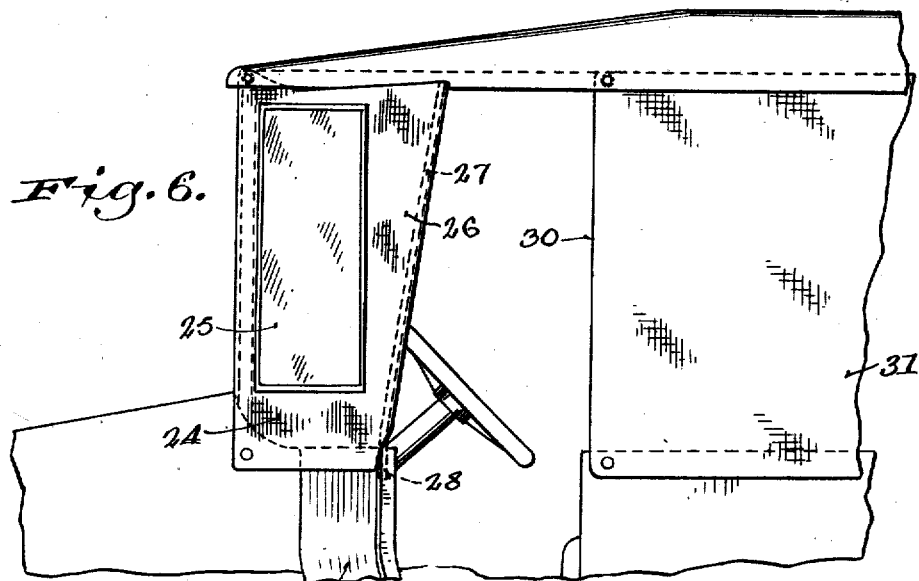

Patented Sept. 12, 1922.

1,428,709

UNITED STATES PATENT OFFICE.

MAXIMILIAN RAHR, JR., OF MANITOWOC, WISCONSIN.

VEHICLE CURTAIN.

Application filed August 26, 1920. Serial No. 406,080.

*To all whom it may concern:*

Be it known that I, MAXIMILIAN RAHR, Jr., a citizen of the United States, residing at Manitowoc, county of Manitowoc, and State of Wisconsin, have invented new and useful Improvements in Vehicle Curtains, of which the following is a specification.

This invention relates to curtains for vehicles and is particularly directed to the quarter curtains for automobiles provided with canopy tops.

This invention is an improvement over that disclosed in my co-pending application, Serial No. 254,937, filed Sept. 20, 1918, for vehicle quarter curtains.

Objects of this invention are to provide a quarter curtain for vehicles, such for example, as automobiles having canopy tops, which forms with the rear curtain an adequate and certain closure; and to provide a substantial overlap of the rear curtain.

Other objects are to provide a quarter curtain for automobiles which may be readily partially detached to allow the free opening of the front door of the automobile without completely detaching the curtain and yet while allowing a complete passageway for the occupants to enter or leave the vehicle; to provide a quarter curtain which may be partly detached to allow a partial view, and which may be quickly adjusted to completely close the front of the automobile when desired.

Other objects are to provide a curtain of improved appearance and simplified design which is adapted for use with the standard types of automobiles.

In the drawings:

Figs. 3 and 4 are views of a modification corresponding respectively to Figs. 1 and 2.

Fig. 5 is a view corresponding to Fig. 1 of a further modification.

Fig. 6 is a view of the structure shown in Fig. 5 with the front door of the automobile open.

Figure 1:
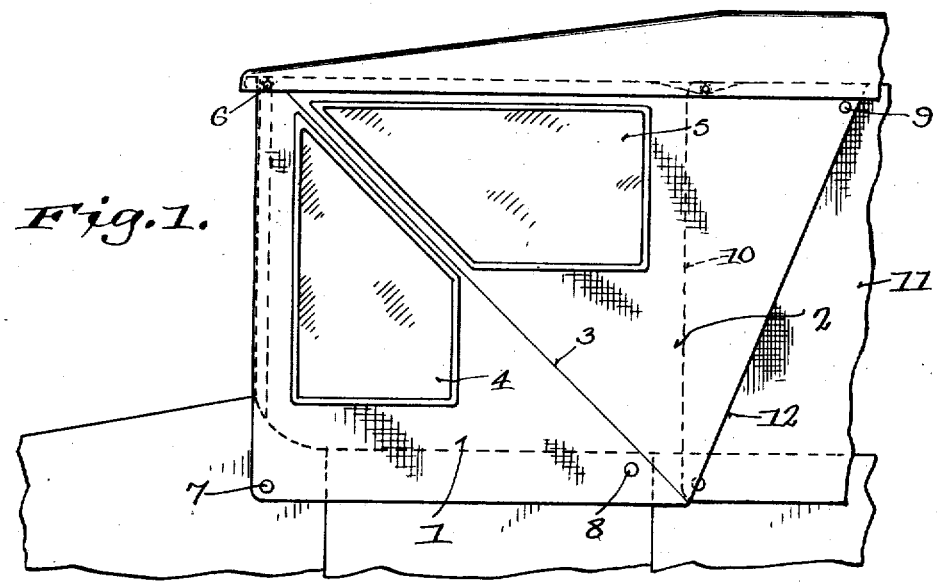
Fig. 1 is a side view of a portion of an automobile showing the curtain in position to secure a complete closure of the front portion.
Figure 2:
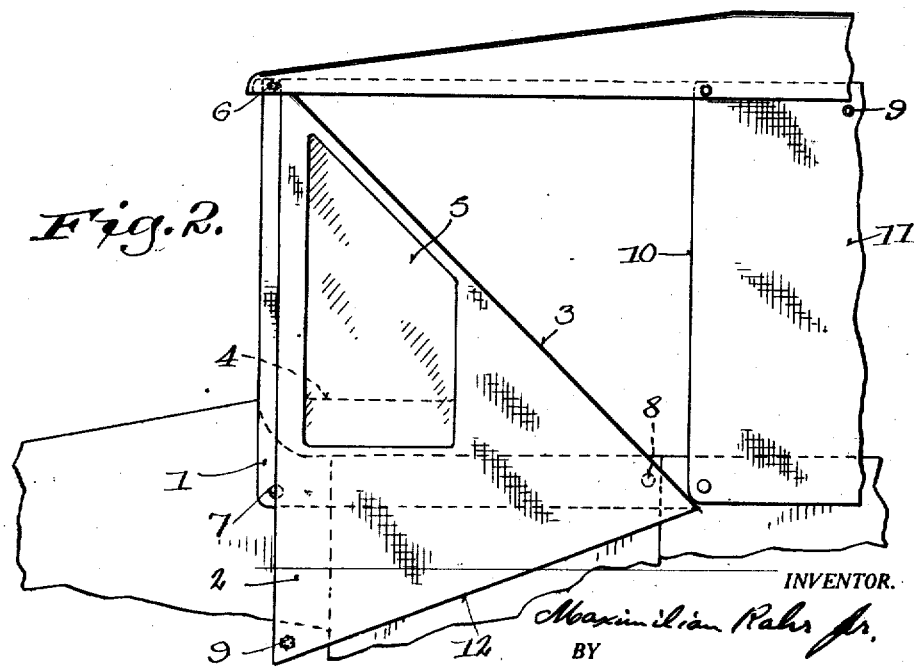
Fig. 2 is a similar view with the curtain partly detached.

Figs. 1 and 2 will first be described. The curtain is formed with a front triangular section 1 and a rear triangular section 2, the sections being joined along the fold line 3 and being provided with transparent windows 4 and 5, respectively, of glass or similar suitable material. The triangular section 1 is secured to the canopy top by the fastener 6, to the lower portion of the automobile by the fastener 7 at the front corner, and 8 at the free end of the door. The section 2 is held solely by the fastener 9 which is spaced a material distance back of the forward portion 10 of the rear curtain 11. The rear edge of the quarter curtain extends diagonally upwardly along the line 12 and forms a substantial overlap over the rear curtain. It will be noted, however, that a single fastener 9 secures the section 2 in position and that by detaching this fastener the curtain may be readily folded along the diagonal line 3. With this type of curtain, the single securing means 9 will be found ample for the retention of the curtain in position due to the diagonal rearwardly and upwardly extending rear edge 12. The wind rushing by the side of the automobile will also cause this rearward portion to bind against the under-lapping portion of the rear curtain 11 thereby aiding in retaining the curtain in position. It is also to be noted that when it is desired to open the door it is merely necessary to detach this single fastening means 9, thereby allowing the curtain to fold downwardly either inwardly or outwardly along the fold line 3 and permitting ready and quick opening of such door. Also, if while the automobile is in motion, it is desired to lower only a portion of the curtain the single fastening means 9 may be detached and the curtain may be folded inwardly along the diagonal downwardly and rearwardly extending fold line 3.

Fig. 2 shows the curtain in folded position. In this position, an unobstructed view is provided adjacent the upper forward portion of the automobile, and at the same time, a substantial protection is afforded occupants of the car.

Figs. 3 and 4 show a further form of quarter curtain in which the forward section 13 is substantially like that shown in Figs. 1 and 2, while the rear section has an elongated rectangular portion 14 with a triangular rear portion 15. The sections 13 and 14 are provided with glass or other transparent portions 22 and 23 corresponding to sections 4 and 5 of the form shown in Fig. 1. The curtain is provided along its lower edge with a series of fasteners 16, one of such fasteners being at the front corner, one at the free corner of the door, and the last at the rear lower corner of the curtain. The upper portion of the curtain is provided with fasteners 17 and 17', the fastener 17' being positioned at the upper rear corner of the curtain to secure the triangular flap 15 in position. In this form of the invention, the curtain may be folded along the diagonal fold line 18 in a manner similar to that described in connection with Figs. 1 and 2, it being necessary, however, to detach both fasteners 16 and 17 to allow this folding. The fold line 18 may extend from adjacent the fastener 17 to a point adjacent the fastener 16 instead of occupying the position shown in Figs. 3 and 4.

This type of curtain is particularly for automobiles in which the front edge 19 of the rear curtain 20 does not extend sufficiently near the front door 21 of the automobile to allow the structure shown in Figs. 1 and 2 to be used.

Figs. 5 and 6 show a further form of the invention in which the rear fasteners for the curtain are dispensed with. In this form, the curtain has a substantially rectangular forward portion 24 provided with a glass or other transparent part 25 and a triangular rear portion 26. This triangular rear portion is reenforced along its slanting edge by a metal bar or rod 27 which has an angular lower end 26 arranged to seat within a socket in an automobile door 29. The upper edge of the curtain is arranged to underlap the canopy top as in the other forms of the invention and this, together with the support given to the lower end of the rod 27, securely positions the rear edge of this curtain in place. When it is desired to open the door, the upper edge is slipped beneath the canopy top by either depressing the curtain section slightly or raising the edge of the canopy top. Thereafter the door 29 may be opened carrying with it the rod 27 and the curtain. The rear triangular section 26 overlaps the forward edge 30 of the rear curtain 31 in a manner similar to that previously described.

In this form of the invention, it is not necessary to detach any fasteners in opening the door and it is also unnecessary to provide two transparent sections with a full line therebetween as in the other form.

Fig. 6 shows the door open and the curtain in its corresponding position. It will be seen that this form facilitates quick opening and closing of the door and is particularly applicable to a machine in which the occupants are constantly entering and leaving.

I claim:

The combination of an automobile having a canopy top, a door, a rear curtain, and a front quarter curtain, said front quarter curtain having a main forward body portion of substantially rectangular contour and having a triangular rear portion unitarily formed therewith and having one of its apices adjacent the bottom corner of the rectangular portion, and a fastening means carried by the upper apex and at the rearmost portion of the curtain, and a cooperating fastening means carried by said rear curtain, at a point a material distance from the forward edge of said rear curtain whereby upon detachment of said fastening means said door may be opened without disturbing any other point of attachment of said quarter curtain.

In testimony whereof I affix my signature in the presence of two witnesses.

MAXIMILIAN RAHR, Jr.

Witnesses:
 J. Moss,
 P. C. Weber.